Oct. 24, 1950  G. F. W. GRAINGER  2,526,944
MACHINERY FOR TREATMENT OF PLASTIC SUBSTANCES
Filed June 10, 1944  3 Sheets-Sheet 1

Inventor
G. F. W. Grainger
By
Mason, Porter & Diller
Attorneys

Oct. 24, 1950  G. F. W. GRAINGER  2,526,944
MACHINERY FOR TREATMENT OF PLASTIC SUBSTANCES
Filed June 10, 1944  3 Sheets-Sheet 2

Inventor
G. F. W. Grainger.
By
Mason, Porter & Diller
Attorney

Oct. 24, 1950 G. F. W. GRAINGER 2,526,944
MACHINERY FOR TREATMENT OF PLASTIC SUBSTANCES
Filed June 10, 1944 3 Sheets-Sheet 3
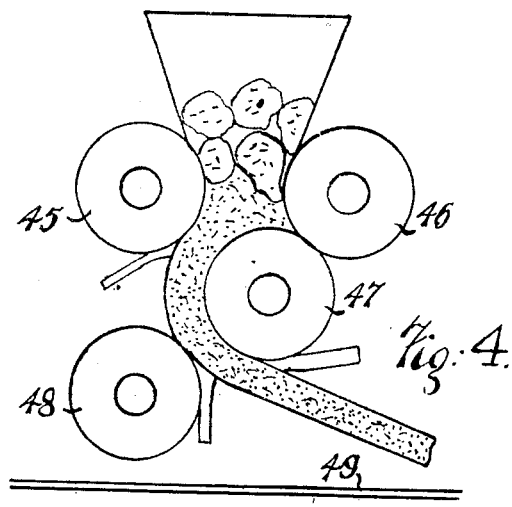
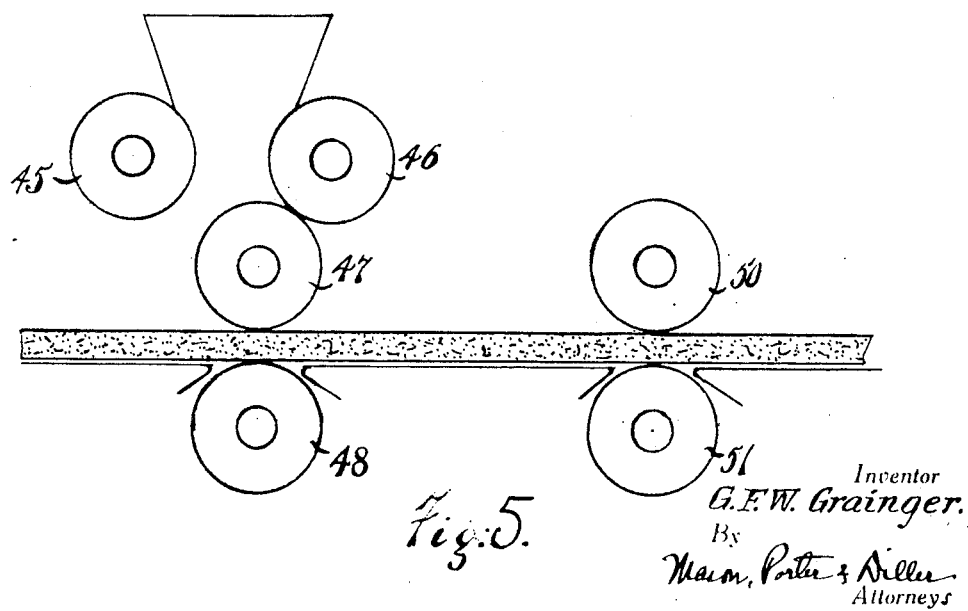
Inventor
G. F. W. Grainger.
By Mason, Porter & Diller
Attorneys Patented Oct. 24, 1950

2,526,944

UNITED STATES PATENT OFFICE 2,526,944

MACHINERY FOR TREATMENT OF PLASTIC SUBSTANCES

George Frederick William Grainger, Earlestown, Newton-le-Willows, England, assignor to T. & T. Vicars Limited, Earlestown, Newton-le-Willows, England, a British company Application June 10, 1944, Serial No. 539,743
In Great Britain April 5, 1943

Section 1, Public Law 690, August 8, 1946
Patent expires April 5, 1963

4 Claims. (Cl. 107—12)

The present invention relates to improvements in the treatment of plastic substances, and more particularly to the treatment of dough in the manufacture of biscuits and the like confectionery goods.

A three-roll machine capable of dealing with hard and soft doughs is known in which one of the rolls can be swung out of operative position when operating on soft dough, so that the machine in one adjustment where the three rollers are operating together can take up dough lumps from a hopper and feed these to a compression chamber formed by the space between the three rolls delivering a sheet of dough between one of the top rolls and a bottom roller, the three rolls being disposed with their axes as an inverted triangle. In the other adjustment of the machine one roller is out of operation whilst the other two rolls serve as gauging rollers, and usually as the first pair of a two-pair or multiple-pair gauging roll machine.

By this invention a machine for the manufacture of a sheet or web of dough or the like plastic material comprises three or more rollers grouped on parallel axes to present a dough compression space between them, and an additional roller spaced from one of the rollers of the said group, the dough leaving the said compression space as a sheet or web adhering to a roller being carried round the periphery of this roller to be further compressed between this roller and the said additional roller.

Machines according to the invention will be described with reference to the accompanying drawings, in which—

Figure 2:
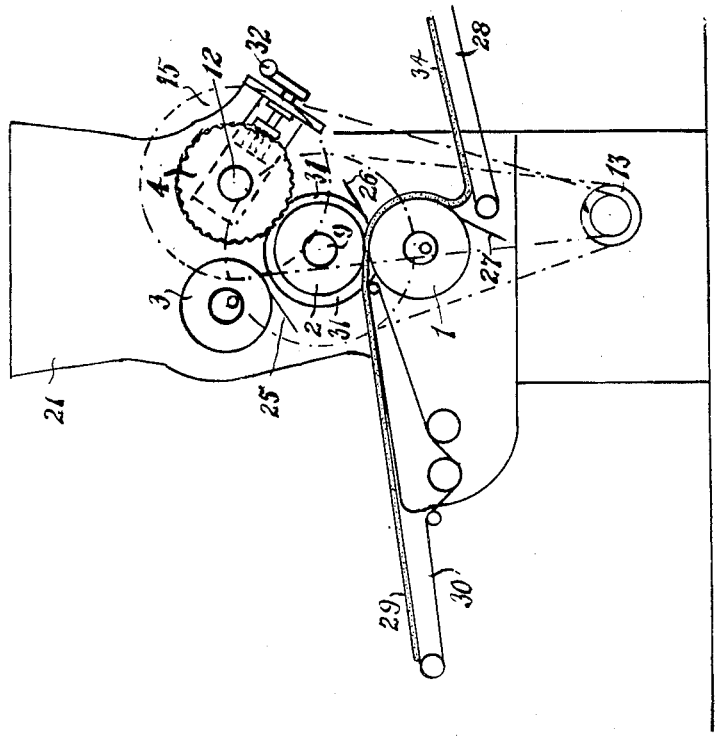
Figure 1:
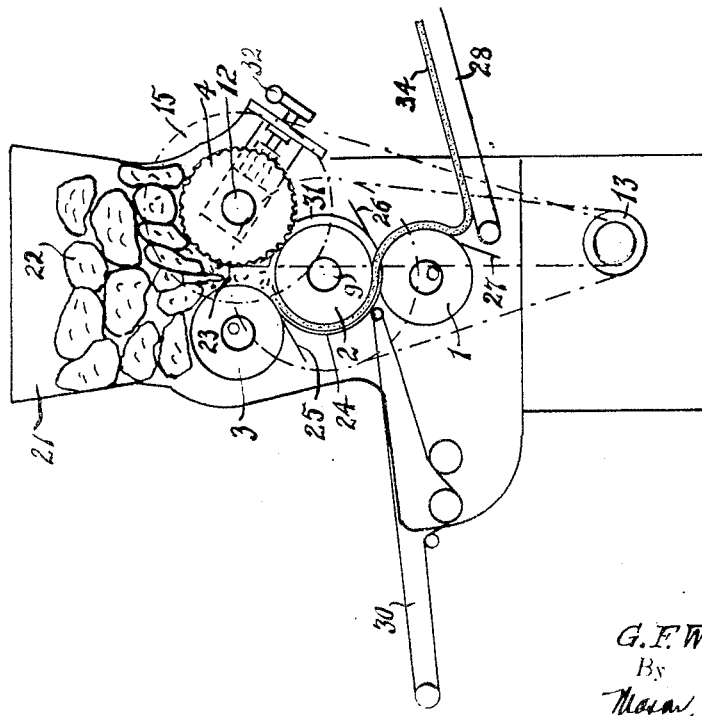
Figure 3:
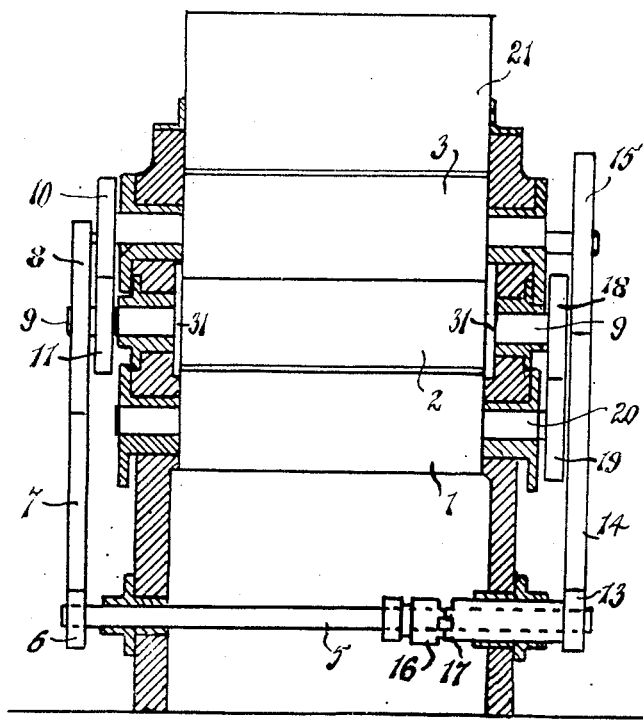

Fig. 1 is a diagrammatic side sectional view of one form of construction of machine, Fig. 2 is a corresponding view with the parts in a different position, so that the machine can function solely as a gauging machine, Fig. 3 is an end sectional view corresponding to the arrangement of Fig. 2, Figs. 4, 5 and 6 are diagrams of modified forms of machines according to this invention.

In Figs. 1–3 roller 1 is the bottom gauging roller, roller 2 is the top gauging roller, roller 3 is the sheeter thickness roller, and roller 4 the sheeter forming roller.

For the correct functioning of the roller combination, the centres between rollers 1 and 2, 2 and 3, 3 and 4, should be adjustable. These adjustments are necessary to allow for varying thicknesses of dough to pass through the rollers, and for the purpose of this description, rollers 1 and 3 have their shafts mounted in eccentric bearings, and the shaft of roller 4 is mounted in adjustable slide blocks. Roller 2 is shown as having fixed centres.

Rollers 1, 2 and 3 may have smooth surfaces, whilst roller 4 may be grooved, as shown, so as to help in feeding the dough through the rollers. Roller 2 is preferably flanged at either end, as at 31.

For the driving of the rollers a common driving shaft 5 is shown, which shaft may be driven by gears, belt, or any known means from a motor or from other sections of the machine. Roller 2 is driven from this shaft by means of chain sprocket 6 on the shaft 5, chain 7 and chain wheel 8 mounted on shaft 9 of roller 2. Roller 3 may be driven by gear wheels 10 and 11 mounted on the shafts 12 and 9 of rollers 2 and 3. Roller 4 may be driven from shaft 5 by means of chain sprocket 13, chain 14, and chain wheel 15 on shaft 12. Roller 1 may be driven by gears 18 and 19, 18 being on shaft 9 of roller 2 and 19 being on shaft 20 of roller 1.

The drives to rollers 3 and 4 may be disconnected if these rollers are not in use. The connection between rollers 2 and 3 may be broken by adjusting the eccentric bearing of roller 3 so that the rollers are so wide apart that the gear teeth do not engage. The drive to roller 4 may be disconnected from shaft 5 by the disconnecting of driving clutch 16 from sleeve 17 on which chain sprocket 13 is mounted.

It may be necessary to alter the relative speeds of rollers 1 and 2 so that roller 1 may be driven from other sources than the gears 18 and 19.

When the combination of rollers is acting as a sheeter for dough or other plastic substances, hopper 21 is filled with dough 22 in irregular masses as received from the mixer. These lumps of dough are drawn in and consolidated in chamber 23 formed by the substantially spherical triangular space between the peripheries of rollers 2, 3 and 4. From this chamber a sheet of dough 24 is rolled out between rollers 2 and 3. The sheet of dough adhering to the surface of rollers 2 will be taken in between rollers 2 and 1 and additional rolling may or may not be given to the sheet according to the distances apart of the surfaces of these rollers, the axes of rollers 2, 3 and 4 all being preferably adjustable relatively to one another.

It will be appreciated that a sheet of dough formed by rollers 2 and 3 cannot be reduced in thickness by rollers 2 and 1 unless the surface speed of roller 1 is increased by the amount necessary to deal with the faster moving sheet which will be made by the reduction in its thickness.

It may be desirable, when working pre-formed sheets, to have the surfaces of rollers 1 and 2 moving at the same speed. Therefore, it may be necessary to provide alternative speeds of drive for roller 1 relative to roller 2.

To keep the sheet moving progressively from one roller to another, scraper 25 detaches the sheet from roller 3, scraper 26 detaches the sheet from roller 2, and scraper 27 detaches the sheet from roller 1. The completed sheet is carried away from the rollers by conveyor band 28 for further processing.

When pre-formed sheets are being gauged to thickness, then rollers 3 and 4 can be put out of connection with their driving gear, and rollers 1 and 2 only used for accepting the pre-formed sheets 29 being delivered directly to the bight of the rollers 1 and 2 by a feed table or by a conveyor band 30, the finished gauged sheet 34 being carried away by conveyor band 28.

Figs. 4 and 5 shown an alternative arrangement of rollers according to this invention. In the arrangement of Figure 4, dough compressed in the space between rollers 45, 46 and 47 emerges as a sheet or web adhering to the roller 47 and is further compressed between this roller and the roller 48 before being led away by conveyor 49. The roller 48 may, however, be swung down into the position shown in Fig. 5, in which case the rollers 45 and 46 will be out of action and a preformed web of dough may then be passed between rollers 47 and 48 acting as gauging rollers for the said pre-formed sheet. The web in each case may be passed through a second pair of gauging rollers such as 50, 51.

Figure 6:
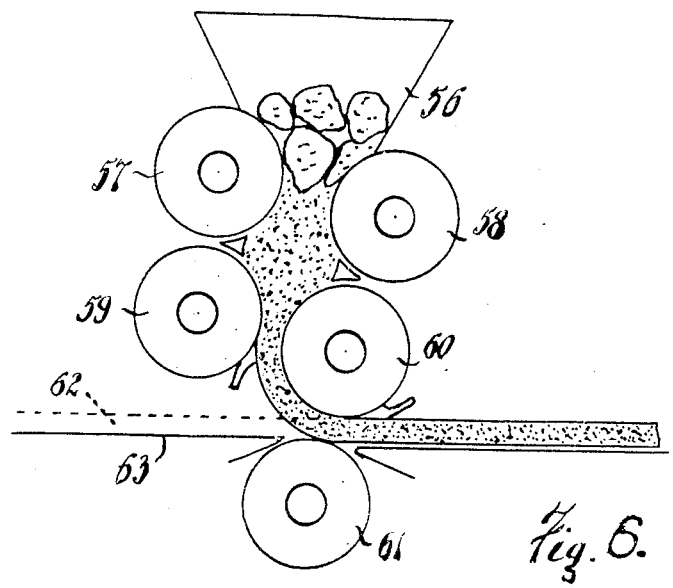

Fig. 6 shows diagrammatically the application of the invention to a four roller sheet forming machine in which dough from a hopper 56 is compressed in the space between the rollers 57, 58, 59 and 60 and emerges as a sheet or web in adherence with the roller 60 to be further compressed between rollers 60 and 61. The roller 61 may be driven at a slightly higher peripheral speed than the roller 60. Also the roller 60 may be driven at the same speed as rollers 57, 58 and 59 or at a slightly higher peripheral speed.

This machine also may be used as a gauging machine with the rollers 57, 58 and 59 out of action, a sheet or web, as indicated at 62, being passed to the bight of rollers 60, 61, which may then be driven at similar speeds, by conveyor 63.

I declare that what I claim is:

1. A machine for the manufacture of a sheet of dough comprising a hopper for dough, a pair of rollers spaced apart below said hopper to receive dough therefrom, a third roller below said pair of rollers and defining therewith a dough compression space but spaced away from one roller of said pair to serve for sheeting dough coming from said compression space and an additional roller below said third roller and being operatively spaced therefrom a lesser distance than that between the third roller and the said one roller of the pair to serve as a transfer and gauging roller for a formed sheet of dough, all said rollers being on parallel axes.

2. A machine as claimed in claim 1 having means to adjust the distance between the said additional roller and the said third roller.

3. A machine as claimed in claim 1 having means to drive said additional and third rollers independently of the other rollers.

4. A machine for the manufacture of a sheet of dough, comprising a hopper, a compression chamber beneath the hopper, the walls of which include at least three rollers mounted on parallel axes below said hopper, two of which rollers are spaced to form an entry opening from the hopper to said compression chamber while a third roller is spaced from one of said pair of rollers to form an exit space from said compression chamber, means to strip the dough sheet from the said one roller of the pair, a fourth roller spaced from said third roller to form dough sheet gauging means therewith, and means to strip dough from said third roller after gauging treatment between said third and fourth rollers.

GEORGE FREDERICK
WILLIAM GRAINGER.

REFERENCES CITED

The following references are of record in the file of this patent:

UNITED STATES PATENTS

| Number | Name | Date |
|---|---|---|
| 489,973 | Mitchell | Jan. 17, 1893 |
| 968,110 | Barbieri | Aug. 23, 1910 |
| 1,728,703 | Smith | Sept. 17, 1929 |
| 1,830,426 | Crosland | Nov. 3, 1931 |

FOREIGN PATENTS

| Number | Country | Date |
|---|---|---|
| 321,403 | Great Britain | Nov. 4, 1929 |